United States Patent [19]

Mago

[11] 4,263,167
[45] Apr. 21, 1981

[54] POLY(ALKYLENE OXIDE) COMPOSITIONS

[75] Inventor: Blake F. Mago, Pocono Pines, Pa.

[73] Assignee: Union Carbide Corporation, New York, N.Y.

[21] Appl. No.: 53,536

[22] Filed: Jun. 29, 1979

[51] Int. Cl.$^3$ ............... C23F 11/16; C23F 11/14; C23F 11/12

[52] U.S. Cl. ............... 252/391; 252/52 A; 252/57; 252/78.1; 252/79; 252/392; 252/393; 252/404; 260/45.85 P

[58] Field of Search ............... 252/393, 404, 79, 78.1, 252/52 A, 57, 391, 392; 260/45.85 P

[56] References Cited

U.S. PATENT DOCUMENTS

| | | | |
|---|---|---|---|
| 3,362,932 | 1/1968 | Mauz | 252/404 |
| 3,377,385 | 4/1968 | Turumaru et al. | 252/393 |
| 3,705,786 | 12/1972 | Kaye | 252/79 |

FOREIGN PATENT DOCUMENTS

| | | | |
|---|---|---|---|
| 2425213 | 6/1975 | Fed. Rep. of Germany | 252/393 |
| 49-79332 | 7/1974 | Japan . | |
| 52-68251 | 6/1977 | Japan . | |
| 1134337 | 11/1968 | United Kingdom | 252/393 |

Primary Examiner—Deborah L. Kyle
Attorney, Agent, or Firm—Franklyn Schoenberg

[57] ABSTRACT

Poly(alkylene oxide) compositions are provided which exhibit excellent resistance to oxidative degradation and inhibit the corrosion of ferrous metals, which compositions have incorporated therein a small effective amount of a bridged dimer of a hydroxyl-substituted aromatic carboxylic acid and salts thereof of the general formula:

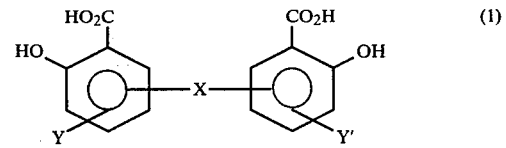

(1)

or

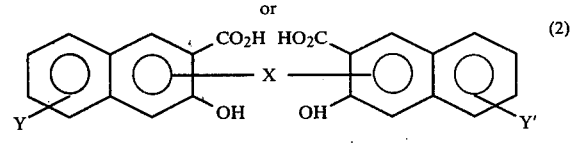

(2)

wherein X is a chemically stable group selected from lower alkylene, sulfonyl, and amino groups, and a sulfur atom, and Y and Y' may be the same or different, and are a hydrogen atom, hydroxyl group, amino group, alkyl group, or sulfonyl group.

18 Claims, No Drawings

POLY(ALKYLENE OXIDE) COMPOSITIONS

BACKGROUND OF THE INVENTION

This invention relates to improved poly(alkylene oxide) compositions and, more particularly, to poly(alkylene oxide) compositions and aqueous solutions thereof that exhibit excellent resistance to oxidation and that inhibit corrosion of ferrous metals with which they come in contact.

Poly(alkylene oxide) polymers have many and diverse industrial applications, providing not only compatibility with water, but good lubricating qualities and stability as well. Thus, these materials have found wide use both as substantially 100 percent active compositions and as aqueous solutions in applications such as hydraulic fluids, metal working lubricants, metal treating formulations, and the like. As with all materials that may contain some water, these must protect metals with which they come in contact, and ferrous metals are of particular interest. Corrosion-inhibitive additives are therefore commonly included in the poly(alkylene oxide) containing compositions for this purpose, and success or failure in a particular application may well depend upon the quality of protection for metals realized in service.

A potential hindrance to the protection accorded is that, like most organic polymers, poly(alkylene oxides) are oxidized by oxygen at elevated temperatures. Even in an aqueous medium, oxidation of the polymer can have a significant effect on the lubricating quality of the fluid. Moreover, the products of oxidation are usually acids that foster corrosion of most metals and further limit the useful life of the polymer-containing compositions.

Heretofore, alkali metal nitrites such as sodium nitrite have been widely used as additives for poly(alkylene oxide) solutions to inhibit corrosion of metals, their powerful passivating effect on ferrous metals being well known. Recently, however, carcinogenic properties of N-nitrosamines, which are the reaction products of secondary amines with nitrites, have caused serious concern about the advisability of using nitrites; and the replacement of nitrites with additives that do not present a health hazard, yet are effective in corrosion inhibition, is of considerable interest.

Several known corrosion inhibitors were tested for their ability to passivate and protect steel as well as to be compatible with aluminum, brass, copper, and solder coupled to brass. However, it was found that at elevated temperatures, aqueous poly(alkylene oxide) solutions became acid and deposited solids. These phenomena prompted oxidation studies of poly(alkylene oxide) solutions which unexpectedly showed that nitrite ions are very efficient in preventing the oxidation of higher poly(alkylene oxide) polymers in hot aqueous solutions, in addition to inhibiting corrosion. Accordingly, it was apparent that a suitable replacement for the alkali metal nitrites in poly(alkylene oxide)-containing compositions must impart resistance to oxidation as well as protection against corrosion. While there are a great number of additives known in the art which are useful as corrosion inhibitors or improve the oxidation resistance of organic polymers, to the best of our knowledge, none of these materials have been shown to achieve these combined effects in an aqueous polymer system.

In accordance with the present invention there is provided poly(alkylene oxide) compositions which exhibit excellent resistance to oxidative degradation and inhibit the corrosion of ferrous metals, having incorporated therein a small effective amount of a bridged dimer of a hydroxyl-substituted aromatic carboxylic acid and salts thereof of the general formula:

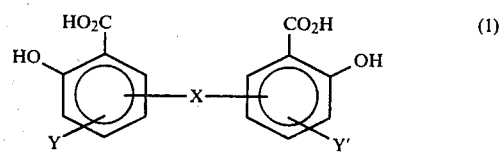

or

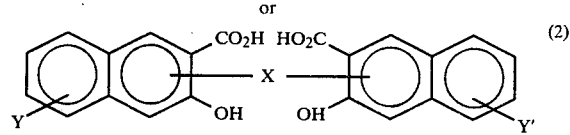

wherein X is a chemically stable group selected from lower alkylene, sulfonyl, and amino groups, and a sulfur atom, and Y and Y' may be the same or different and are a hydrogen atom, hydroxyl group, amino group, alkyl group, or sulfonyl group.

There is also provided in accordance with the present invention aqueous poly(alkylene oxide) compositions having incorporated therein a small effective amount of an additive which is a hydroxyl-substituted aromatic carboxylic acid and salts thereof as hereinabove described. Preferably, said aqueous poly(alkylene oxide) compositions contain at least about 5 millimoles of said additive per liter of composition.

The bridged aromatic acid derivative component of the composition is highly efficient in inhibiting both the oxidation of poly(alkylene oxide) polymer compositions, including aqueous solutions thereof, and also the corrosion of ferrous metals contacted by such compositions, while not presenting any known health hazards or toxicological problems.

Poly(alkylene oxide) polymers suitable for use in the compositions of the invention are known compounds, and even though of high molecular weight, are water-soluble. In general, these polymers will contain oxyethylene groups or both oxyethylene groups and higher oxyalkylene groups, such as oxybutylene and oxypropylene groups, in the molecule and will have average molecular weights from 400 to 40,000. The amount of oxyethylene groups in the molecule is such that the poly(alkylene oxide) polymers are soluble in water at ordinary temperatures, and the amount of oxypropylene or higher oxyalkylene group is such that the poly(alkylene oxide) remains liquid at ordinary temperatures up to a molecular weight of 40,000 and higher or may melt at temperatures below about 60° C. The oxypropylene/oxyethylene ratio may vary from zero to about unity. These poly(alkylene oxide) polymers may be made by processes well known in the art by reacting ethylene oxide or mixtures of ethylene oxide and propylene oxide or higher alkylene oxide with a compound having at least one active hydrogen atom up to as many as six such active hydrogen atoms including, for example, water, monohydroxylic alcohols such as ethanol and propanol, dihydroxylic alcohols such as ethylene glycol, trihydroxylic alcohols such as glycerine and trimethylolpropane, tetrahydroxylic alcohols such as pentaerythritol, hexahydroxylic alcohols such as sorbitol, and mono- or poly-functional amines such as butylamine and ethylene diamine. The poly(alkylene oxide)

products of such reaction will have linear or branched oxyethylene or oxyethylene-higher oxyalkylene chains and such chains will terminate with hydroxyl groups. Some or all of these hydroxyl groups may be etherified by reaction with a dialkyl sulfate such as diethyl sulfate.

As hereinabove stated, the poly(alkylene oxide) compositions of the invention can be used in their substantially 100 percent active form or as aqueous solutions thereof. The proportions of poly(alkylene oxide) polymers in such aqueous solutions is dependent upon the particular application for which they are intended and can be varied within a wide range to obtain the desired results. In general, the aqueous solution contains any amount of polymer from about 0.1 percent by weight to about 50 percent by weight.

An essential component of the compositions of the invention is a bridged dimer of hydroxyl-substituted aromatic carboxylic acid of the general formula:

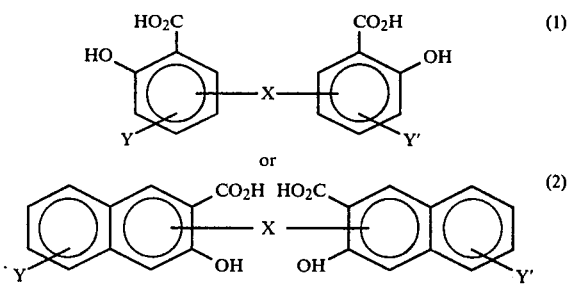

wherein X is a chemically stable group selected from lower alkylene, sulfonyl, and amino groups, and a sulfur atom, and Y and Y' may be the same or different, and are a hydrogen atom, hydroxyl group, amino group, alkyl group, or sulfonyl group.

Suitable acids are, for example, methylene or sulfur bridged, hydroxyl-substituted aromatic carboxylic acids such as 5,5'-methylenedisalicyclic acid, pamoic acid, and thiodisalicylic acid. The compound may be present in the composition as a salt such as an alkali metal or ammonium salt.

As a general rule, the bridged dimer of an aromatic carboxylic acid is used in an amount sufficient to impart the desired degree of protection, depending upon the severity of the operating conditions and service requirements in the particular application. The minimum proportions may vary somewhat depending on such factors and may be readily determined by routine experimentation. The maximum amount of additive that should be used is not critical, with economic factors generally determining the use of amounts greatly in excess of that actually required. The amount of bridged dimer of aromatic carboxylic acid that should be used will be termed herein as an "effective amount", which is defined as being above the minimum required to achieve the oxidation resistance and corrosion protection required for a particular application. In general, however, the minimum "effective amount" will be at least about 5 millimoles of additive per liter of polymer solution.

The compositions of this invention as well as the controls which demonstrate the prior art were evaluated for oxidation resistance and corrosion inhibition as follows. The inhibition of oxidation of aqueous solutions of poly-(alkylene oxide) were studied using a 10% solution of the polymer in distilled water heated to 70° C., above which temperature some polymer tends to separate from water due to its known inverse solubility.

All-glass reaction cells 75 mm in diameter and 200 mm high were used. The cells were equipped via 71/60 ST joints with heads that contained glass joints for inserting a thermometer, an aeration tube, and a reflux condenser. Test solutions of 400 grams charged to each cell were heated to 70° C. in a thermostatically controlled liquid bath for a period of 8 days while sparging continuously with filtered air at a flow rate of 50-100 cc/min. The extent of oxidation that occurred during this period was determined by titrating a sample with standard base and by noting the change in its viscosity at 40° C.

Studies of corrosion inhibition of aqueous solutions of poly(alkylene oxide) involved immersion tests of panels of steel for eight days in a 10% polymer solution at 70° C. while sparging lightly with air and then measuring weight loss and noting the appearance of the metal and appearance of the solutions. Inasmuch as the corrosion of steel by aqueous poly(alkylene oxide) solutions is more severe under film disruptive conditions as found in heat exchangers, the corrosion evaluation studies were also made with steel as a heat-transfer surface for a boiling solution using the test apparatus and test procedure described in U.S. Pat. No. 3,951,844. The corrosion inhibiting ability of the various polymer solutions was determined for solutions prepared with distilled water to which, typically, 500 ppm each of sodium chloride, sodium sulfate and sodium formate were added to simulate typical impurities. The samples used in this study were weighed, cold-rolled 4 inches×4 inches×1/16 inch mild steel plates which had been polished and scrubbed with a wet bristle brush and commercial kitchen powder cleaner, rinsed, and dried. The degree of corrosion was determined from the weight change of the steel panel sample after cleaning, with weight loss being recorded in units of mils per year (mpy).

The invention will become more clear when considered together with the following examples, which are set forth as being merely illustrative of the invention and which are not intended, in any manner, to be limitative thereof. Unless otherwise indicated, all parts and percentages are by weight.

EXAMPLE 1

The apparatus and procedures outlines above were used to evaluate the oxidation resistance and corrosion inhibition of steel for 10% solutions of poly(alkylene oxide). In the oxidation and immersion corrosion tests, the poly(alkylene oxide) used was a liquid, water soluble commercial product available under the trademark designation UCON 75-H-90000 (I) from Union Carbide Corporation. In the heat-transfer corrosion tests, the poly(alkylene oxide) used was a liquid, water soluble commercial product available under the trademark designation UCON 75-H-1400 (II) from Union Carbide Corporation. The oxidation and immersion corrosion rates were measured after eight days exposure and the corrosion rates using the heat-transfer apparatus were measured after 3 days.

In these tests compositions containing disodium salt of 5,5'-methylenedisalicylic acid in various proportions were compared with compositions prepared without any inhibitor and those containing sodium nitrite inhibitor. The results obtained during the oxidation tests are summarized in Table I, below and the corrosion tests in Table II, below. The data thus presented show that where no inhibitor was used in the aqueous poly(alkylene oxide) composition, significant acidity developed in the solutions during the oxidation test period and that there was more than a 50% decline in viscosity at 40° C. Moreover, the weight loss of the steel test panels during the corrosion test periods was very high. All of this was almost completely prevented by including as little as 0.1 weight percent (14.5 millimoles per liter) of sodium nitrite in the solution. The sodium methylenedisalicylate additive offered considerable oxidation resistance to the poly(alkylene oxide) solution as well as being efficient in its corrosion inhibition for steel, when suitable amounts said additive were employed.

tive employed in the compositions of this Example and the oxidation resistance are summarized in Table III, below and the corrosion inhibition results of the compositions are summarized in Table IV, below. Poly(alkylene oxide) I and II are the same polymers employed in the compositions of Example 1, poly(alkylene oxide) I being used in the oxidation and immersion corrosion tests and polymer II being used in the heat-transfer corrosion test. The data thus presented show that bridged aromatic dibasic salts exhibit considerable oxidation protection for the poly(alkylene oxide) solution but that only methylene-bridged and sulfur-bridged

TABLE I

OXIDATION INHIBITION OF POLY(ALKYLENE OXIDE) IN 10% AQUEOUS SOLUTIONS

| Additive | Additive Concentration | | pH | | Acidity Formed | Viscosity Change | |
|---|---|---|---|---|---|---|---|
| | Weight % | M Moles/liter | Initial | Final | (Millinormality) | at 40° C. (%) | Solution Appearance |
| None | — | — | 10.2 | 2.8 | 4.6 | −60 | clear colorless |
| Sodium Nitrite | 0.1 | 14.5 | 8.5 | 5.8 | 0.2 | +2 | clear colorless |
| | 0.5 | 72. | 9.1 | 7.0 | | 0 | clear colorless |
| Methylene-disalicylic Acid, sodium salt | 0.3 | 9.0 | 9.7 | 7.9 | 0.3 | +2 | clear colorless |
| | 0.6 | 18.0 | 9.4 | 8.8 | 0.0 | +2 | clear yellow |
| | 1.2 | 36.0 | 7.3 | 6.3 | 0.7 | +2 | clear amber |

TABLE II

CORROSION INHIBITION OF POLY(ALKYLENE OXIDE) IN 10% AQUEOUS SOLUTIONS

| Poly(alkylene-oxide) | Additive | Additive Concentration | | Corrosion Test | Corrosion Rate Mils per year (mpy) | Solution Appearance |
|---|---|---|---|---|---|---|
| | | Weight % | M Moles/liter | | | |
| I | none | — | — | Immersion (8 days) | 14.8 | rusty |
| II | none | — | — | Heat-transfer (3 days) | 81 | rusty |
| I | Sodium nitrite | 0.2 | 29 | Immersion (8 days) | <0.04 | clear |
| II | Sodium nitrite | 0.05 | 7.2 | Heat-transfer (3 days) | 5.6 | turbid-orange |
| | Sodium nitrite | 0.1 | 14.5 | Heat-transfer (3 days) | 0.4 | clear colorless |
| | Sodium nitrite | 0.25 | 36 | Heat-transfer (3 days) | 0.5 | clear colorless |
| I | Methylenedisalicylic acid, sodium salt | 0.4 | 12.0 | Immersion (8 days) | 0.7 | clear amber |
| II | acid, sodium salt | 0.3 | 9.0 | Heat-transfer (3 days) | 0.9 | clear red |
| II | acid, sodium salt | 0.6 | 18.0 | Heat-transfer (3 days) | 13.0 | very turbid |
| II | acid, sodium salt | 1.19 | 36.0 | Heat-transfer (3 days) | 0.3 | clear amber |

EXAMPLE 2

The procedure described in Example 1 was used in the study of the oxidation resistance and inhibition of corrosion of poly(alkylene oxide) compositions with a variety of additives. The type and proportions of additive employed in the compositions of this Example and aromatic dibasic salts offered good corrosion protection to steel while the diphenate salt offered little or no corrosion protection. Further, it is shown that sodium salicylate, which has a hydroxyl substituent on an aromatic acid nucleus, exhibited good oxidation protection but was not a good corrosion inhibitor for steel.

TABLE III

OXIDATION INHIBITION OF POLY(ALKYLENE OXIDE) IN 10% AQUEOUS SOLUTIONS

| Additive | Additive Concentration | | pH | | Acidity Formed | Viscosity Change | |
|---|---|---|---|---|---|---|---|
| | Weight % | M Moles/liter | Initial | Final | (Millinormality) | at 40° C. (%) | Solution Appearance |
| none | — | — | 10.2 | 2.8 | 4.6 | −60 | clear colorless |
| disodium salt of 5,5'-thiodisalicylic acid | 0.35 | 10.0 | 7.9 | 7.4 | <0.1 | +2 | clear colorless |
| disodium salt of pamoic acid | 0.4 | 9.2 | 9.5 | 4.4 | 3.0 | −6 | turbid orange |
| disodium salt of pamoic acid | 1.55 | 36 | 10.0 | 6.4 | 0.8 | +6 | clear dark amber |
| Sodium salt of salicylic acid | 0.58 | 36 | 9.9 | 8.7 | 1.0 | +3 | clear colorless |
| disodium salt of diphenic acid | 1.04 | 36 | 8.3 | 7.5 | 2.9 | −6 | orange ppt |

TABLE IV

CORROSION INHIBITION OF POLY(ALKYLENE OXIDE) IN 10% AQUEOUS SOLUTIONS

| Poly(alkylene-oxide) | Additive | Additive Concentration | | Corrosion Rate (mpy) | | Solution Appearance |
|---|---|---|---|---|---|---|
| | | Weight % | M Moles/liter | Immersion Test (8 days) | Heat Transfer (3 days) | |
| I | none | — | — | 14.8 | — | rusty |

TABLE IV-continued

| Poly(alkylene-oxide) | Additive | Additive Concentration | | Corrosion Rate (mpy) | | Solution Appearance |
| --- | --- | --- | --- | --- | --- | --- |
| | | Weight % | M Moles/liter | Immersion Test (8 days) | Heat Transfer (3 days) | |
| II | none | — | — | — | 81 | rusty |
| I | disodium salt of 5,5'-thiodisalicylic acid | 0.3 | 8.6 | 8.0 | — | — |
| II | disodium salt of 5,5'-thiodisalicylic acid | 0.3 | 8.6 | — | 2.6 | — |
| I | disodium salt of pamoic acid | 0.2 | 4.6 | 4.5 | — | — |
| I | disodium salt of pamoic acid | 0.4 | 9.2 | 7.4 | — | turbid amber |
| II | disodium salt of pamoic acid | 0.2 | 4.6 | — | 1.3 | amber |
| II | disodium salt of pamoic acid | 0.4 | 9.2 | — | 0.8 | orange ppt |
| II | sodium salt of salicylic acid | 0.58 | 36 | — | 31 | clear very red |
| II | disodium salt of diphenic acid | 1.04 | 36 | — | 21 | turbid brown |

Although this invention and various of the benefits thereof, such as providing poly(alkylene oxide) compositions which exhibit both excellent resistance to oxidative degradation and inhibit the corrosion of ferrous metals while not presenting any known health hazards or toxicological problems have been described in its preferred forms, with a certain degree of particularity, it is understood that the present disclosure has been made only by way of example, and that numerous changes can be made without departing from the spirit and the scope of the invention.

What is claimed is:

1. A poly(alkylene oxide) composition which exhibits excellent resistance to oxidative degradation and inhibits the corrosion of ferrous metals comprising a poly(alkylene oxide) having incorporated therein an effective amount of a bridged dimer of a hydroxyl-substituted aromatic carboxylic acid and salts thereof of the general formula:

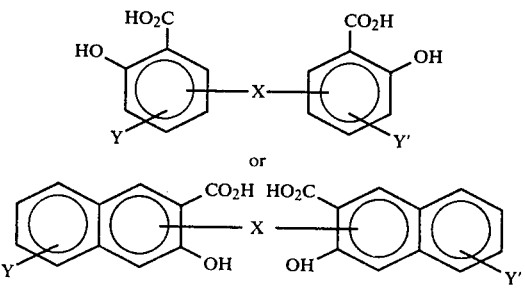

wherein X is a sulfur atom or a chemically stable group selected from the group consisting of lower alkylene, sulfonyl, and amino groups, and Y and Y' may be the same or different, and are a hydrogen atom, hydroxyl group, amino group, alkyl group, or sulfonyl group.

2. An aqueous composition comprising said poly(alkylene oxide) composition of claim 1 and water said composition containing 0.1 percent to about 50 percent by weight of poly(alkylene oxide).

3. The composition of claim 2 containing at least about 5 millimoles of said bridged dimer per liter of composition.

4. The composition of claim 2 which is a solution.

5. The composition of claim 2 wherein said bridged dimer acid is selected from the group consisting of 5,5'-methylenedisalicylic acid, pamoic acid, and thiodisalicylic acid.

6. The composition as claimed in claim 1 wherein X is a lower alkylene group.

7. The composition as claimed in claim 1 wherein X is a methylene group.

8. The composition of claim 1 wherein said bridged dimer acid is selected from the group consisting of 5,5'-methylenedisalicylic acid, pamoic acid, and thiodisalicylic acid.

9. The composition of claim 8 wherein said bridged dimer acid is 5,5'-methylenedisalicylic acid.

10. The composition of claim 1 wherein said poly(alkylene oxide) is water soluble.

11. The composition of claim 1 wherein said poly(alkylene oxide) is characterized by the presence of both oxyethylene groups and higher oxyalkylene groups.

12. The composition of claim 1 wherein said composition has incorporated therein the sodium salt of said bridged dimer of aromatic carboxylic acid.

13. A method for preparing poly(alkylene oxide) compositions which exhibit resistance to oxidative degradation and inhibit the corrosion of ferrous metals which comprises incorporating in a poly(alkylene oxide) composition an effective amount of a bridged dimer of a hydroxyl-substituted aromatic carboxylic acid and salts thereof of the general formula:

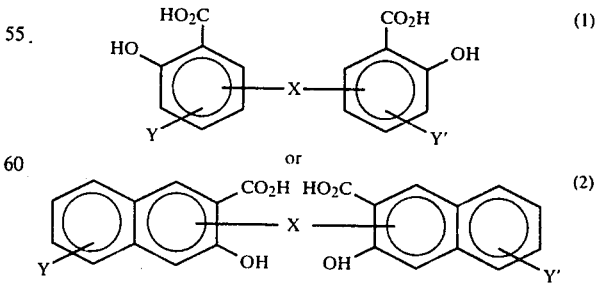

wherein X is a sulfur atom or a chemically stable group selected from the group consisting of lower alkylene, sulfonyl, and amino groups, and Y and Y' may be the same or different, and are a hydrogen atom, hydroxyl group, amino group, alkyl group, or sulfonyl group.

14. The method of claim 13 wherein said poly (alkylene oxide) composition is an aqueous composition.

15. The method of claim 14 wherein at least about 5 millimoles of said bridged dimer is added per liter of composition.

16. The method of claim 13 wherein X is a lower alkylene group.

17. The method of claim 13 wherein said bridged dimer acid is selected from the group consisting of 5,5'-methylene-disalicylic acid, pamoic acid, thiodisalicylic acid, and their sodium salts.

18. The method of 17 wherein said bridged dimer acid is 5,5'-methylene-disalicylic acid.

* * * * *